Figure 1:
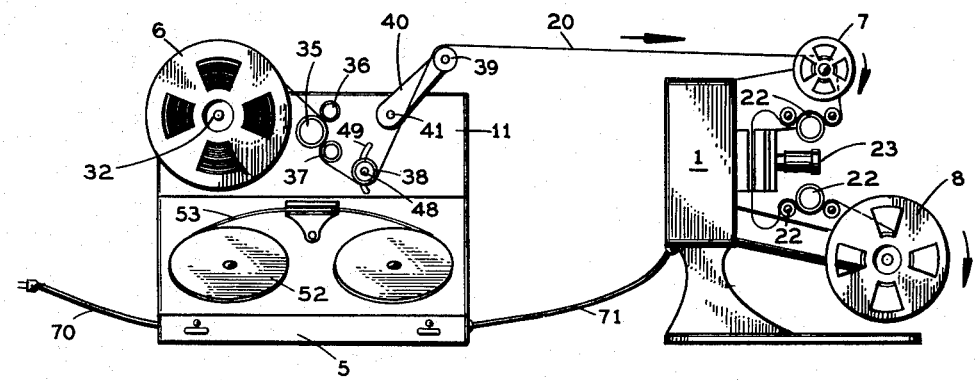

Feb. 8, 1966     E. W. LOVELAND     3,233,957
SYNCHRONIZING ATTACHMENT FOR PICTURE PROJECTORS
AND SOUND RECORDERS
Filed June 17, 1963     2 Sheets-Sheet 1

INVENTOR.
ERIC W. LOVELAND
BY
*James M. Bye*
AT TORNEY

Feb. 8, 1966  E. W. LOVELAND  3,233,957
SYNCHRONIZING ATTACHMENT FOR PICTURE PROJECTORS
AND SOUND RECORDERS
Filed June 17, 1963  2 Sheets-Sheet 2

INVENTOR.
ERIC W. LOVELAND
BY
ATTORNEY

United States Patent Office 3,233,957
Patented Feb. 8, 1966

3,233,957
SYNYCHRONIZING ATTACHMENT FOR PICTURE PROJECTORS AND SOUND RECORDERS
Eric W. Loveland, 5720 SW. 56th St., Fort Lauderdale, Fla.
Filed June 17, 1963, Ser. No. 288,254
7 Claims. (Cl. 352—14)

This invention relates to means by which the speed of travel of the tape of a sound reproducing device, such as a tape recorder, can be synchronized to the speed of travel of a motion picture projector to thereby cause the projection of the picture to be properly accompanied by sound reproduction.

While the speed for photographing and projecting 8 mm. motion pictures is usually 16 frames per second, this is not sufficient to reproduce good quality sound on a magnetic sound stripe which may be added to the motion picture film, therefore a speed of 24 frames per second is generally employed. It is an object of the invention to provide a simple apparatus that allows sound pictures to be made and shown by no alteration or modification to either the motion picture camera or projector even though said camera or projector is designed to operate at only 16 frames per second.

It is an object of the invention to provide an apparatus of this character by means of which a tape recorder of conventional construction can be suitably coupled to any type of so-called "home" motion picture projectors which employ feed sprocket wheels, such as uses 8 and 16 mm. film, and without alterations or modifications of the projector and the motion picture film and the recording tape driven at a constant relative speed to the film, thereby securing the required synchronism of the picture and sound.

The invention contemplates the provision of simple means by which the rate of speed of the motion picture film to the projector take-off reel is in constant relation to the speed of the recording tape, and the invention further contemplates the provision of sensing and speed-regulating braking means whereby the sound tape speed will be controlled to conform to a constant relative speed to the motion picture film passing through the projector.

It is an object of the invention to provide an apparatus of this kind by which recordings made on conventional one-quarter inch sound tape may be used, such as for example, those that are made which represent sounds during photographing, which permits the cutting, adding or splicing of a film so made; which permits the film projector to operate at its normal rate of speed of 16 frames per second, while the magnetic tape operates at the standard speed of 3¾ inches per second. Variations in projector speed will cause a constant proportional variation in recording tape speed without loss of synchronization of picture and sound. The apparatus described allows a standard projector to be used without modification and the tape recorder may be used in its conventional manner.

With these and other objects to be hereinafter set forth in view, I have devised the arrangement of parts to be described and more particularly pointed out in the claims appended hereto.

Figure 2:
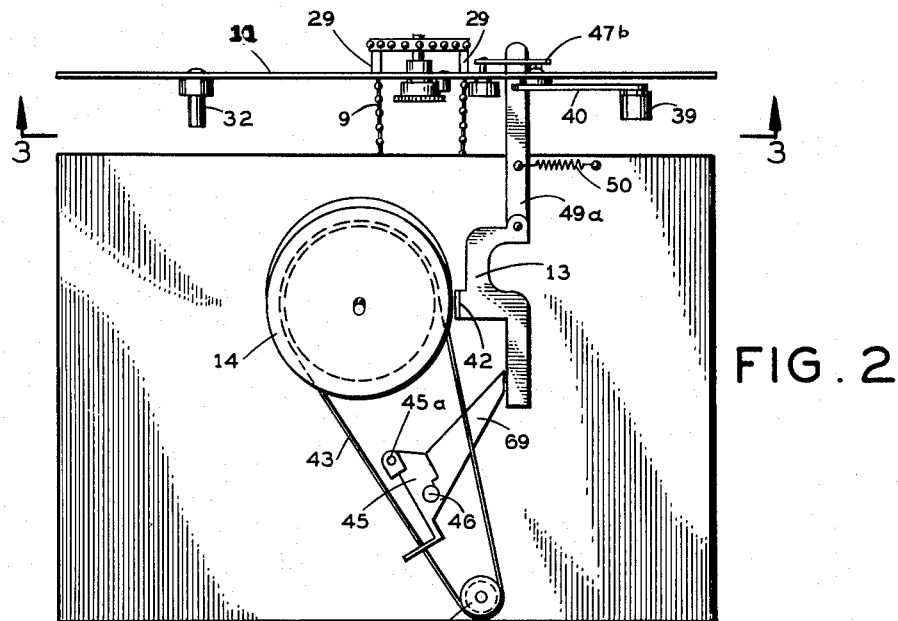
Figure 3:
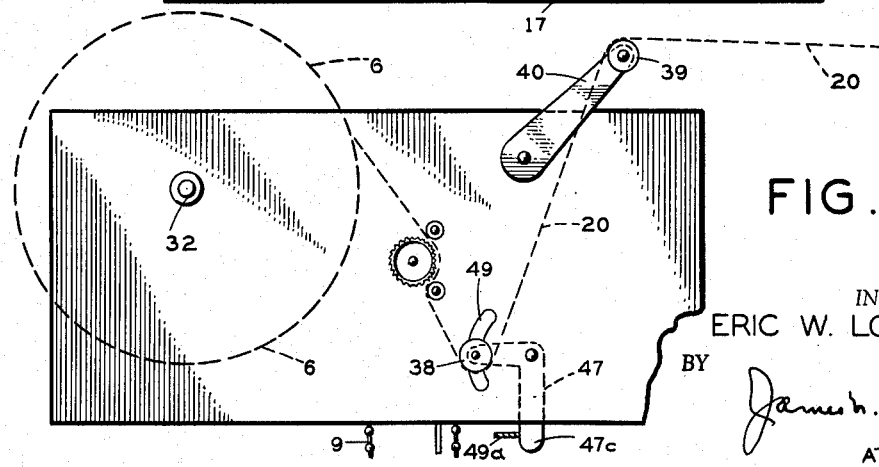
Figure 4:
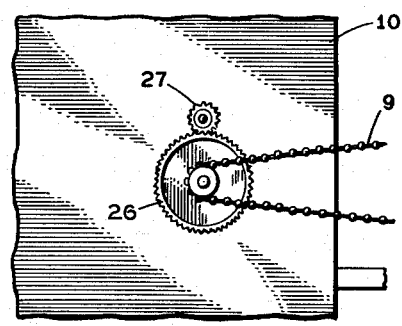
Figure 5:
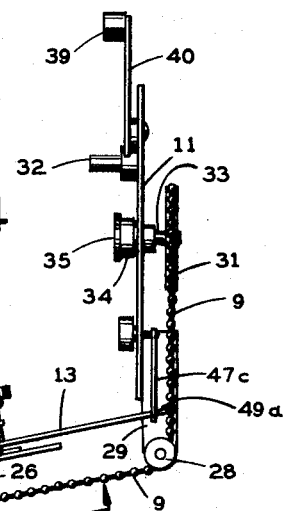
Figure 6:
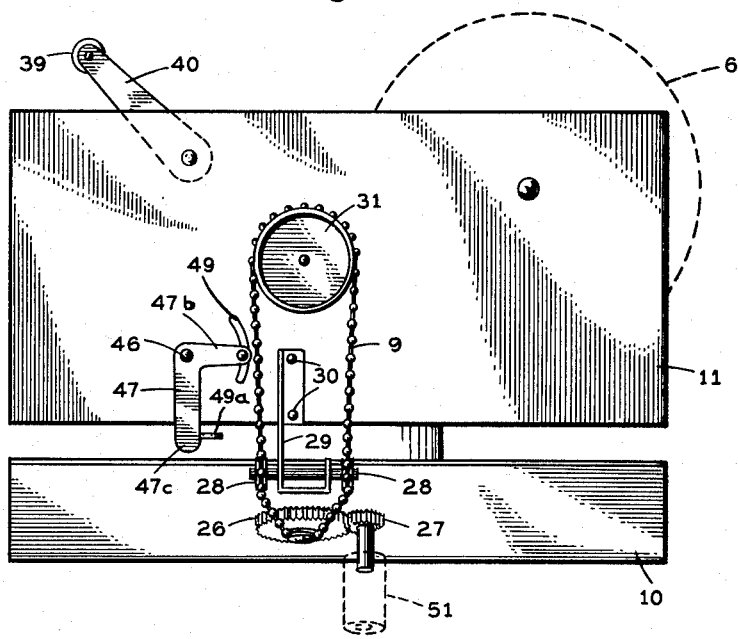

In the drawings:
FIG. 1 is an elevational view of a motion picture projector connected to the sound tape mechanism for effecting the sound reproduction;
FIG. 2 is a top plan view of the synchronizing mechanism;
FIG. 3 is a sectional view, taken substantially on the line 3—3 of FIG. 2, looking in the direction of the arrows;
FIG. 4 is an end view as seen from the right of FIG.2;

FIG. 5 is a sectional view, taken substantially on the line 5—5 of FIG. 4, looking in the direction of the arrows; and
FIG. 6 is a rear view as seen from the right of FIG. 4.

The improved synchronizing device is particularly adapted for the purpose of synchronizing the speed of the conventional one-quarter inch magnetic sound tape to the speed of travel of the motion picture film through a conventional home motion picture projector, such as one employing 8 mm. film, thereby enabling recorded sound to be played back in synchronism with the picture being projected on the screen.

At 1 is generally indicated a motion picture projector of the type just mentioned and of conventional form provided with a feed or take-off reel serving as a pulley and shown at 7 and to which the motion picture film 20 is fed from a film reel 6 freely mounted on a spindle 32 projecting from the front of a panel 11 disposed at the back of a conventional tape recorder 5. The motion picture film 20, thus fed to the upper reel 7 on the projector, extends therefrom around the projector sprockets 22 and past the conventional projecting means 23, thereafter being wound up on the usual collection or take-up reel 8. The film travels in the direction indicated by the arrows in FIG. 1.

The travel of the motion picture film 20 from the supply reel 6 to cause it to pass around the projector reel 7, is attained by means of a beaded or other type drive chain 9 which passes around a grooved pulley 24 provided on a spindle 25, which carries a gear 26 engaged and driven by a pinion 27 coupled by a coupling 51 to the drive from the tape recorder 5.

The recorder is supplied with current through the electrical cord 70 and it is provided with an electrical outlet from which a cord 71 extends to supply the operating current for the projector.

The drive chain 9 extends from beneath the panel 10 of the tape recorder and passes over idlers 28 rotative in a bracket 29 fastened to the back of the panel 11 as shown at 30. From the idlers 28 the chain extends upwardly behind the panel 11 to pass around a grooved pulley 31. The pulley 31 is mounted on a shaft 33 rotative in a bearing 34 in the panel 11 and carrying a film sprocket 35 around which the motion picture film 20 drawn from the reel 6 passes and which is held in engagement with the sprocket 35 by means of the upper and lower rollers indicated respectively at 36 and 37. After passing between the rollers 36 and 37 and over the driven sprocket 35, the film passes under a roller 38 carried on a sensing arm in the form of a bell-crank lever 47, and it then extends over a roller 39 carried at the end of an arm 40, which is attached at 41 to the panel 11. The film 20 then proceeds to pass around the reel 7 on the projector, from which it is taken for projection through the projector in the conventional manner.

There is provided a brake mechanism which consists of a brake arm 13 having a shoe portion 42 operative against a drum 14 mounted on the drive shaft 25, said drum being engaged by a belt 43 which extends around a double-grooved pulley 17 rotative on a spindle 44 rising from the panel 10. The belt 43 extends through a slotted guide 18 in the form of a lever 45, pivoted at 45a on the panel 11, said lever being provided with an upstanding handle 19 by which it can be pivotally moved to shift the belt from one groove to the other in the pulley 17.

Pivotally mounted at 46 on the back of the panel 11 is the bell-crank lever 47 constituting a sensing arm which has one of its arms 47b connected to the axle 48 on which the roller 38 is mounted and the axle 48 of said roller is movable through an arcuate slot 49 during the pivotal movements of the bell-crank lever. The downwardly dependent arm 47c of the bell crank lever 47 engages against an extension 49a of the brake lever 13, said lever 47 being spring-biased by means of a spring 50, and at the required times it allows the brake lever 13 to move under the pull of the spring 50 to apply the shoe 42 against the brake drum 14 and thereby slow down the rotation of the film sprocket 35 to a speed synchronous to the speed of the sprockets 22 of the projector.

The device as herein described will synchronize the speed of the magnetic tape 53 of the tape recorder 5 to the speed of the 8 mm. film moving through the projector 1, thus enabling the playing of the recorded tape sound to synchronize with the projected pictures. With the construction disclosed, the film sprocket 35 on the panel 11, driven by the chain 9 over the pulley 31, will rotate faster than the sprockets 22 on the projector, thus tending to increase the size of the loop formed under the sensing roller 38. The sensing arm or bell-crank lever 47 will pivotally move, lowering its roller-carrying arm 47b and causing its brake-engaging arm 47c to swing in a direction away from the brake arm 49a, thus causing the spring 50 to apply the brake shoe 42 against the drum 14 driven by the tape recorder mechanism. This braking action slows down the rotation of the film sprocket 35 to a speed synchronous to the speed of the sprockets 22 of the projector.

The lever 45 is provided with an extended arm 69 adapted for engagement by a part of the brake lever 13 so that the drive belt can be shifted from one of the grooves in the pulley 17 to its other groove, which changes the speed of the tape recorder and also isolates the brake and sensing mechanism, thus alowing the tape recorder to record or play back sound at 3¾" per second.

In the described construction, no alterations are required in the projector so that the same may be used independently of the recorder at any time in the usual manner.

Having thus described a single embodiment of the invention, it is obvious that the same is not to be restricted thereto, but is broad enough to cover all structures coming within the scope of the annexed claims.

What I claim is:

1. A means for motion picture and sound reproduction comprising, a motion picture projector and a tape sound recorder, the projector having a film take-off reel and projector sprocket means for feeding the film from said reel, a film supply reel located remotely from the projector and from which film is delivered to the projector take-off reel, a feed sprocket located between the film supply reel and the projector take-off reel and engaging the film in its passage between the reels, a movable sensing arm carrying a roller over which the film passes after leaving the feed sprocket, drive means for the feed sprocket, a brake operative to control the speed of the drive means, means biasing the brake toward application on the drive means, the sensing arm tending to hold the brake in an off position while the film is under required tension and being operative to release the brake and permit its application when slackness occurs in the film.

2. A means for motion picture and sound reproduction as provided for in claim 1, wherein the brake means consists of a pivoted arm, the biasing means therefor consisting of a spring, the drive means including a rotated drum, the brake having a shoe for application against said drum under the influence of the spring, and the sensing arm being in the form of a bell-crank lever.

3. A means for motion picture and sound reproduction comprising, a tape recorder having a panel on which a film feed reel is rotatively mounted, a sprocket rotative on the panel and engaged by film taken from the feed reel, a projector to which the film is fed, a movable arm carrying a roller under which the film passes and which acts to maintain a tensioned loop in the film before the film passes to the projector, means operative from the recorder for driving the sprocket, brake means for slowing the operation of the drive means, and the movable arm being operative to permit braking operation of said brake means when the tension of the film against the roller slackens.

4. A means for motion picture and sound reproduction as provided for in claim 3, wherein the drive means for the sprocket consists of a spindle driven from the recorder, a pulley carried by the spindle, a chain extending about the pulley, a shaft on which the sprocket is mounted, said shaft carrying a sprocket engaged by the chain.

5. A means for motion picture and sound reproduction as provided for in claim 3, wherein the drive means for the sprocket includes a spindle driven from the recorder, said spindle carrying a drum, the brake means being a pivotal lever having a shoe for operation against the drum, spring means for urging the shoe-bearing part of the brake lever toward the drum, and the movable arm engaging the brake lever to hold its shoe away from the drum as long as the film is held under tension sufficiently to maintain said arm in contact with the brake lever.

6. A means for motion picture and sound reproduction comprising, a tape recorder having a support on which a film feed reel is rotatively mounted, a sprocket rotative on the support and engaged by film drawn from the feed reel, a projector having a reel to which the film is fed and from which the film proceeds to the projection mechanism of the projector, a movable arm in the form of a bell-crank carrying a roller under which the film passes after leaving the sprocket and which acts to form a tensioned loop in the film before the film reaches the reel on the projector, means operative from the recorder for driving the sprocket, brake means in the form of a pivoted lever for slowing the operation of the drive means, the movable arm having a part normally in the path of swing of the brake lever and being operative to permit braking operation of said brake means when the tension of the film against the roller is relieved.

7. A means for motion picture and sound reproduction comprising, a projector and a tape recorder, a film supply reel for furnishing film to the projector, feed means interposed between the film supply reel and the projector for feeding film from the supply reel, means for driving the feed means from a rotative element on the tape recorder, a pivoted roller interposed between the feed means and the projector, and means acted upon by said roller to slacken the speed of the feed means when slack occurs in the film between the feed reel and the projector.

References Cited by the Examiner

UNITED STATES PATENTS 2,095,831 10/1937 Philips _____ 352—15

FOREIGN PATENTS 1,039,801 5/1953 France.
310,476 3/1930 Great Britain.
836,449 6/1960 Great Britain.

NORTON ANSHER, *Primary Examiner.*